(12) United States Patent
Frueh et al.

(10) Patent No.: US 9,449,426 B2
(45) Date of Patent: Sep. 20, 2016

(54) METHOD AND APPARATUS FOR CENTERING SWIVEL VIEWS

(71) Applicant: Google Inc., Mountain View, CA (US)

(72) Inventors: Christian Frueh, Mountain View, CA (US); Ken Conley, Mountain View, CA (US); Sumit Jain, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 314 days.

(21) Appl. No.: 14/101,606

(22) Filed: Dec. 10, 2013

(65) Prior Publication Data

US 2015/0163402 A1    Jun. 11, 2015

(51) Int. Cl.
*G06T 15/20* (2011.01)
*G06T 7/00* (2006.01)
*H04N 5/00* (2011.01)
*G06T 7/20* (2006.01)
*H04N 5/262* (2006.01)

(52) U.S. Cl.
CPC .......... *G06T 15/205* (2013.01); *G06T 7/2033* (2013.01); *G06T 2207/10016* (2013.01); *H04N 5/2627* (2013.01)

(58) Field of Classification Search
None
See application file for complete search history.

(56) References Cited

U.S. PATENT DOCUMENTS

| | | | | |
|---|---|---|---|---|
| 7,751,651 B2* | 7/2010 | Oldroyd | ................ | G01S 11/00 382/103 |
| 8,098,958 B2* | 1/2012 | Oldroyd | ................ | G01C 11/00 382/103 |
| 2005/0220363 A1* | 10/2005 | Oldroyd | ................ | G01C 11/00 382/294 |
| 2006/0215935 A1* | 9/2006 | Oldroyd | ................ | G01C 11/00 382/294 |
| 2007/0279494 A1* | 12/2007 | Aman | ................ | G01S 3/7864 348/169 |
| 2010/0254612 A1* | 10/2010 | Oldroyd | ................ | G01C 11/00 382/209 |
| 2013/0202197 A1* | 8/2013 | Reeler | ................ | G01S 17/89 382/154 |

* cited by examiner

*Primary Examiner* — Reza Aghevli
(74) *Attorney, Agent, or Firm* — McDonnell Boehnen Hulbert & Berghoff LLP

(57) ABSTRACT

Methods and an apparatus for centering swivel views are disclosed. An example method involves a computing device identifying movement of a pixel location of a 3D object within a sequence of images. Each image of the sequence of images may correspond to a view of the 3D object from a different angular orientation. Based on the identified movement of the pixel location of the 3D object, the computing device may estimate movement parameters of at least one function that describes a location of the 3D object in an individual image. The computing device may also determine for one or more images of the sequence of images a respective modification to the image using the estimated parameters of the at least one function. And the computing device may adjust the pixel location of the 3D object within the one or more images based on the respective modification for the image.

26 Claims, 12 Drawing Sheets

901

902

1001

1002

Computer Program Product 1400

Signal Bearing Medium 1401

Program Instructions 1402

- identifying movement of a pixel location of a 3D object within a sequence of images, wherein images of the sequence of images correspond to views of the 3D object from different angular orientations about the 3D object;

- based on the identified movement of the pixel location of the 3D object within the sequence of images, estimating movement parameters of at least one function that describes a location of the 3D object in an individual image given a position of the individual image within the sequence of images;

- determining for one or more images of the sequence of images a respective modification to the image using the estimated parameters of the at least one function; and

- adjusting the pixel location of the 3D object within the one or more images of the sequence of images based on the respective modification for the image.

| Computer Readable Medium 1403 | Computer Recordable Medium 1404 | Communications Medium 1405 |

FIGURE 14

METHOD AND APPARATUS FOR CENTERING SWIVEL VIEWS

BACKGROUND

In computer graphics, three-dimensional (3D) modelling refers to the process of developing a mathematical representation of any three-dimensional surface of an object. The representation may be referred to as a 3D object data model, or simply a 3D model. Various techniques exist for creating 3D models, such as creating a 3D model using 3D computer graphics software, merging several photographs of an object to create a 3D model, or using a 3D scanning device to create a point cloud of geometric samples on surfaces of an object.

Once a 3D model has been created, the 3D model may then be displayed as a two-dimensional image via a 3D rendering process. Various 3D rendering methods also exist. The methods range from non-realistic wireframe rendering, which may take only fractions of a second and can be done in real-time, to more advanced techniques such as scanline rendering or ray tracing, which may be more computationally expensive but can be used to create photo-realistic effects.

An alternative way to provide a user with a 3D experience is to provide a swivel viewer. A swivel viewer is often configured to sequentially display images that are captured from different positions around the object in order to create the impression that the object is being rotated in place. By way of example, the swivel viewer may be configured to initially display one of 72 images captured from different positions covering 360 degrees around the object. Each of the 72 images may represent a different view. In response to receiving a request to rotate the view of the object, the swivel viewer may then replace the initial image with an image captured from an adjacent position around the object, thereby providing a different view of the object. Furthermore, as multiple images are browsed through and displayed in sequence, the object may appear to swivel or rotate.

SUMMARY

One technique for generating various swivel views for a swivel viewer involves capturing images of an object from a stationary position while the object is rotated on a turntable. When using this technique, small offsets of the object from the center of the turntable can produce a noticeable wobble when the swivel views are combined and displayed in a swivel viewer. As one example, a small offset may create a horizontal "orbiting" effect as the object is swiveled in the swivel viewer. For instance, rather than rotating in place, the position of the object may appear to orbit around a fixed position. As another example, a small offset may create a vertical "bouncing" effect and size change effect when the object is rotated in the swivel viewer, due to the changing perspective and distance to the camera as the object is rotated on the turntable. The described effects can make resulting swivel views unpleasant to watch or even unusable for product representation. Ordinarily, the effects are removed by centering the object on the turntable, and capturing new images. Rather than requiring new images of the object to be created, the disclosed methods and systems help eliminate or substantially mitigate the described effects using post-processing computer vision techniques.

In one example aspect, a method is provided that involves a computing device receiving a sequence of images of a three-dimensional (3D) object. Images of the sequence of images correspond to views of the 3D object from different angular orientations about the 3D object. The method also involves the computing device identifying movement of a pixel location of the 3D object within the sequence of images. The method further involves, based on the identified movement of the pixel location of the 3D object within the sequence of images, the computing device estimating movement parameters of at least one function that describes a location of the 3D object in an individual image given a position of the individual image within the sequence of images. The method also involves the computing device determining for one or more images of the sequence of images a respective modification to the image using the estimated parameters of the at least one function. And the method then involves the computing device adjusting the pixel location of the 3D object within the one or more images of the sequence of images based on the respective modification for the image.

In another example aspect, a non-transitory computer-readable memory having stored thereon instructions executable by a computing device to cause the computing device to perform functions is provided. The functions involve identifying movement of a pixel location of a three-dimensional (3D) object within a sequence of images. Images of the sequence of images correspond to views of the 3D object from different angular orientations. The functions also involve, based on the identified movement of the pixel location of the 3D object within the sequence of images, estimating movement parameters of at least one function that describes a location of the 3D object in an individual image given a position of the individual image within the sequence of images. The functions further involve determining for one or more images of the sequence of images a respective modification to the image using the estimated parameters of the at least one function. And the functions also involve adjusting the pixel location of the 3D object within the one or more images of the sequence of images based on the respective modification for the image.

In yet another example aspect, a computing device that includes a processor and a computer-readable medium is provided. The computer-readable medium is configured to store instructions, that when executed by the processor, cause the computing device to perform functions. The functions involve identifying movement of a pixel location of a three-dimensional (3D) object within a sequence of images. Images of the sequence of images correspond to views of the 3D object from different angular orientations. The functions also involve, based on the identified movement of the pixel location of the 3D object within the sequence of images, estimating movement parameters of at least one function that describes a location of the 3D object in an individual image given a position of the individual image within the sequence of images. The functions further involve determining for one or more images of the sequence of images a respective modification to the image using the estimated parameters of the at least one function. And the functions also involve adjusting the pixel location of the 3D object within the one or more images of the sequence of images based on the respective modification for the image.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 14 is a schematic illustrating a conceptual partial view of an example computer program product that includes a computer program for executing a computer process on a computing device, arranged according to at least some embodiments presented herein.

DETAILED DESCRIPTION

Figure 1:
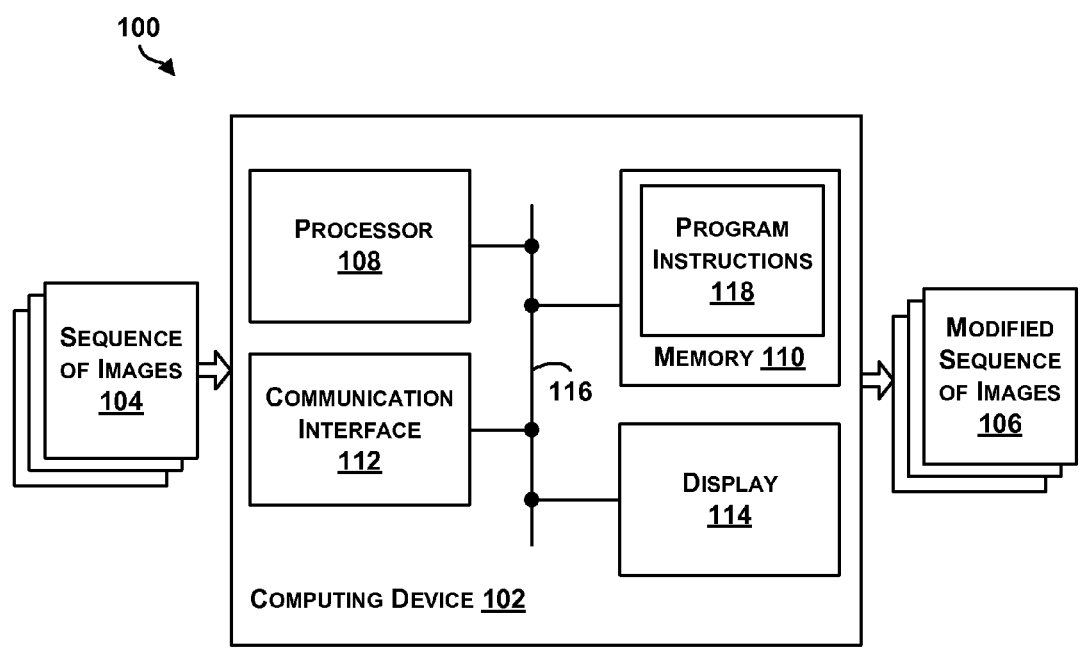
FIG. 1 illustrates an example system for auto-centering swivel views.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for auto-centering swivel views using computer vision techniques. As used herein, the term swivel view may refer to an image of an object that is used in a swivel viewer to present a view of the object. One technique for generating various swivel views for a swivel viewer involves capturing images of an object from a stationary position while the object is rotated on a turntable. In some instances, capturing images of an object from a stationary position while the object is rotated on a turntable can produce a noticeable wobble when the images are combined and displayed in a swivel viewer. By way of example, a small offset of the position of the object from a center of the turntable can produce one or any combination of a horizontal "orbiting" effect, a vertical "bouncing" effect, and a size change effect when the images are used in a swivel viewer.

The horizontal "orbiting" effect refers to the effect of the object appearing to orbit around a fixed position, rather than rotating in place, when rotated in the swivel viewer. For an object placed off-center on a turntable, the center of the object will prescribe a horizontal circle in 3D space, and thus off-center effects show in first-order a sinusoidal behavior with the turntable angle when projected into a camera capturing images from the side of the turntable. More specifically, for a perfect parallel camera projection where the projection rays are parallel to the turntable, the center of the object would prescribe a perfect sinusoidal horizontal pixel offset in swivel views of the object. The horizontal pixel offset would therefore be a function of the scanning angle, i.e., the current angle of the turntable within a range of 0 to 360 degrees.

Furthermore, if the camera projection were a perfect parallel projection with an angle that is offset from a plane of the turntable (e.g., looking slightly down on the object or looking slightly up towards the object), there would also be an additional vertical "bouncing" effect. The vertical "bouncing" effect would create a sinusoidal vertical pixel offset as a function of the scanning angle of the turntable.

Additionally, in some instances, there may be an additional size change effect, since the object is sometimes closer and other times farther away from the camera over the course of a rotation around the turntable. This size change effect can also in first order be modeled sinusoidally.

As described herein, observed horizontal and vertical pixels offsets in a sequence of captured images may be fitted to one or more models that described the expected offsets for an off-centered object. Similarly, the observed pixel offsets may be used to model the size change effect in the sequence of images. The described methods and systems can then compensate for the pixel offsets and size change effect by shifting one or more captured images in the opposite direction(s) of the expected pixel offset(s) and/or scaling one or more images. As a result, the object may appear to be perfectly centered and rotate around its center when displayed in a swivel viewer.

In some examples, the described methods and systems may eliminate the need to capture new images of an object that was not properly centered on a turntable or the need to manually adjust the images. Moreover, the described methods and systems can correct the off-center effects described above with or without requiring knowledge of the camera calibration and/or geometric layout of a scene. The described methods and systems can also be utilized to correct user-contributed swivel views, captured on unknown turntables. Various example implementations of the methods and systems are described below with reference to the figures.

Referring now to the figures, FIG. 1 illustrates an example system 100 for auto-centering swivel views. The system includes a computing device 102 that may be configured to receive a sequence of images 104 and output a modified sequence of images 106. In one instance, the sequence of images may be images of a 3D object corresponding to different views of the 3D object. For example, each image may represent an image captured from a different angular orientation about the 3D object. In one example, the images may be captured from equally spaced positions around the 3D object. In some instances, the received sequence of images 104 may be a compressed video. In such an instance, individual images may be recovered by extracting frames of the video.

As described herein, the computing device 102 may be configured to modify one or more of the images of the sequence of images 104 and output the modified sequence of images 106. By way of example, the computing device 102 may shift a location of the 3D object (e.g., horizontally and/or vertically) in one or more images. In some examples, the computing device 102 may scale one or more images to increase or decrease a size of the 3D object in a particular image. In some examples, the computing device 102 may crop one or more of the images of the sequence of images 104 to remove any blank boundaries introduced due to a horizontal and/or vertical shift, for instance. Other example adjustments are also possible.

As shown in FIG. 1, the computing device 102 includes a processor 108, memory 110, communication interface 112, and display 114, all of which may be coupled together by a system bus, network or other connection mechanism 116. The processor 108 may be any type of processor, such as a microprocessor, digital signal processor, multicore processor, etc., coupled to the memory 110. The memory 110 may be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

The memory 110 may be configured to store program instructions 118. The program instructions may be executable by the processor 108. For instance, the program instructions may cause the processor 108 to determine a respective modification to one or more images of the sequence of images 104, and adjust the location of the 3D object within the one or more images based on the respective modification. The program instructions 118 may also be executable to cause the processor 108 to perform other functions, such as any of the functions described herein.

The communication interface 112 may be configured to facilitate communication with one or more other computing devices, in accordance with one or more wired or wireless communication protocols. For instance, the communication interface 112 may be configured to receive the sequence of images 104 from a camera or another type of computing device. Further, the communication interface 112 may be configured to provide the modified sequence of images 106 to another computing device. In some instances, the communication interface 112 may be configured to communicate with one or more computing devices in a cloud-based network. For instance, the communication interface 112 may be configured to send data to a server in a cloud for processing, and receive processed data from the server.

The display 114 may be any type of display device configured to display data. For instance, the display 114 may be an electronic visual display configured to display images of the sequence of images 104 or the modified sequence of images 106. The display device may also be configured to display information related to the models described herein, such as a curve or numerical representation of one or any combination of observed pixel offsets, expected pixel offsets, and estimated parameters of a function.

Different configurations of the system 100 including different components or more or less components than the system 100 are also possible. For instance, the computing device 102 may include more or fewer components. As an example, FIG. 13 described below illustrates another example configuration of a computing device. In another instance, the system 100 may include multiple computing devices arranged to carry out the functions described herein. Thus, the system 100 is not meant to be limiting in any way.

Figure 2:
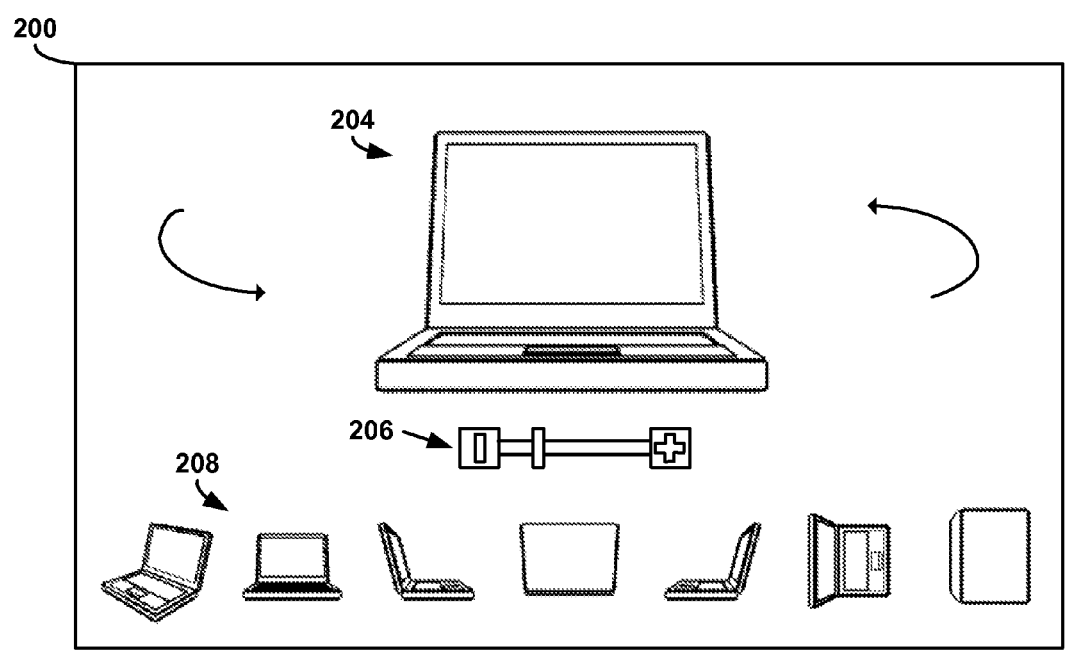
FIG. 2 illustrates an example swivel viewer.

Turning next to FIG. 2, FIG. 2 illustrates an example swivel viewer 200. The swivel viewer 200 illustrates a viewer configured to provide different views of a computer 204. The swivel viewer may be configured to receive input for rotating the view of the computer 204. In one instance, a user may click and drag or slide over the view of the object to cause an adjacent view of the object to be displayed, or to browse through multiple views of the object in sequence.

Additionally, the swivel viewer 200 may be configured to receive input for zooming in on or zooming-out on a particular view of the computer 204. For instance, a user may use the slider 206 to zoom in or zoom out.

Furthermore, as shown in FIG. 2, the swivel viewer 200 includes one or more predetermined views 208 that a user may select to snap to a particular view of the computer 204. By way of example, the predetermined views 208 include a perspective view, front view, left side view, right side view, back view, top view, and bottom view. In other examples, more or less predetermined views may be provided.

Figure 3:
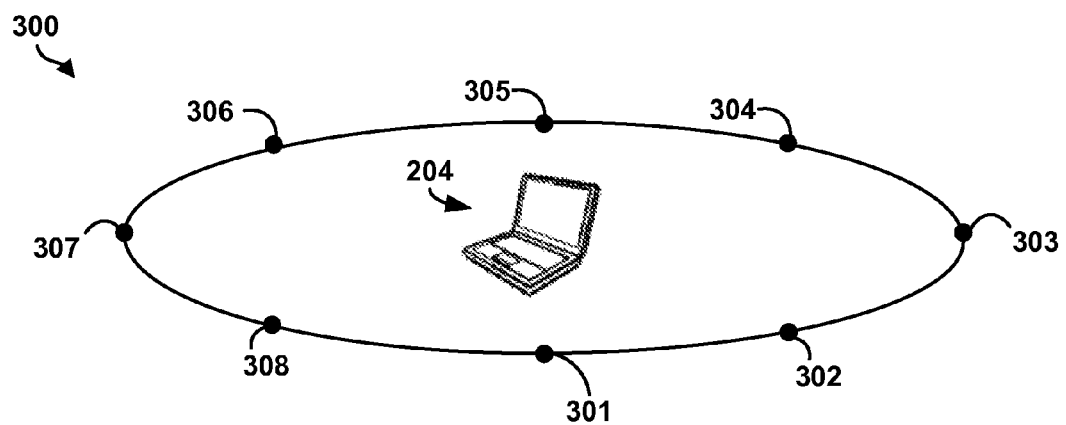
FIG. 3 is a conceptual illustration of example positions along a curved path in a plane perpendicular to an axis that passes through a 3D object.

In some examples, the images utilized by a swivel viewer to present different views of the object may be captured from a sequence of positions along a curved path in a plane perpendicular to an axis that passes through the 3D object. FIG. 3 is a conceptual illustration 300 of example positions 301-308 along a curved path from which images of the computer 204 may be captured. By way of example, the conceptual illustration 300 shows eight equally-spaced positions along a circle surrounding the computer 204. In other examples, images may be captured from more than eight positions along the circle, or from positions along multiple curved paths. For example, images may be captured from positions along a first curved path in a first plane perpendicular to a first axis that passes through a 3D object as well as along a second curved path in a second plane perpendicular to a second axis that passes through the 3D object. Therefore, the example is not meant to be limiting.

Figure 4:
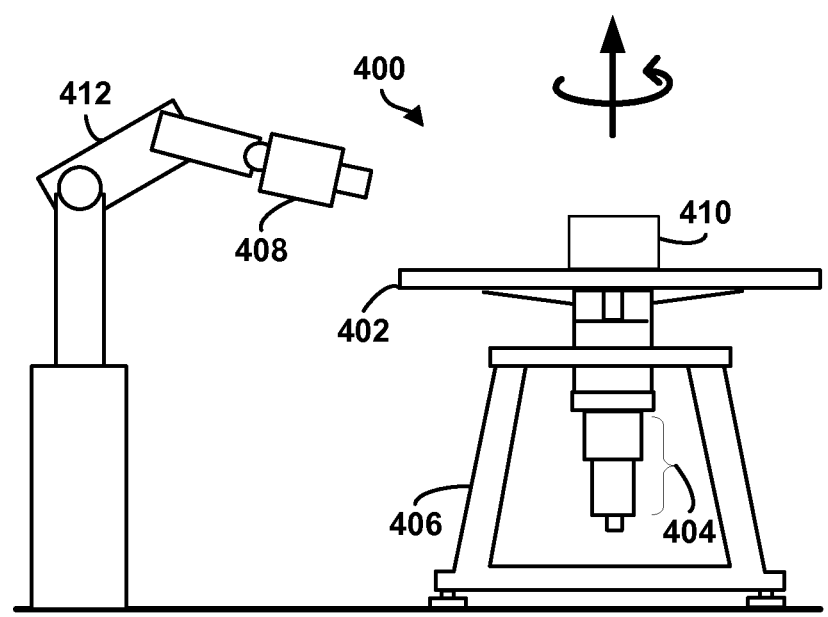
FIG. 4 illustrates an example system for capturing images of a 3D object.

FIG. 4 next illustrates an example system 400 that may be used to capture images of an object along a curved path. In particular, FIG. 4 illustrates a turntable system. The system 400 includes a rotatable surface 402. Although the rotatable surface 402 is illustrated as a circular surface, other shapes are also possible. In one instance, a computing device of the system (not shown) may be configured to cause the rotatable surface 402 to incrementally or continuously rotate using a drive system 404. The drive systems 404, for example, may include one or more motors and motor drive systems configured to receive commands from a computing device and control rotation of the one or more motors. Other drive systems are also possible, and in some instances, the rotatable surface 402 may be configured to be rotated manually (e.g., by an operator of the system 400). The rotatable surface 402 and the drive system 404 may be supported by a support structure 406.

The system 400 may also include one or more cameras. By way of example, a single camera 408 is depicted; however, in other examples, multiple cameras may be positioned at various positions around the support structure 406. The camera 408 may be any type of camera configured to capture 2D and/or 3D information about a 3D object 410. The camera 408 may also be stationary or mobile. For instance, a position of the camera 408 may be controlled by a positioning component 412, such as a robotic arm having six degrees of freedom. Other types of positioning components, such as a single or multiple axis motion controller with any number of actuators and rotary or linear servo motors may also be used. Alternatively, the position of the camera 408 may be manually adjusted by an operator of the system 400.

Although FIG. 4 illustrates a turntable system, in other examples, the camera 408 may be rotated around an object positioned on a stationary table in order to capture images along a curved path. As an example, a camera may be rotated around a circular track that orbits an object placed on a stationary table.

Figure 5:
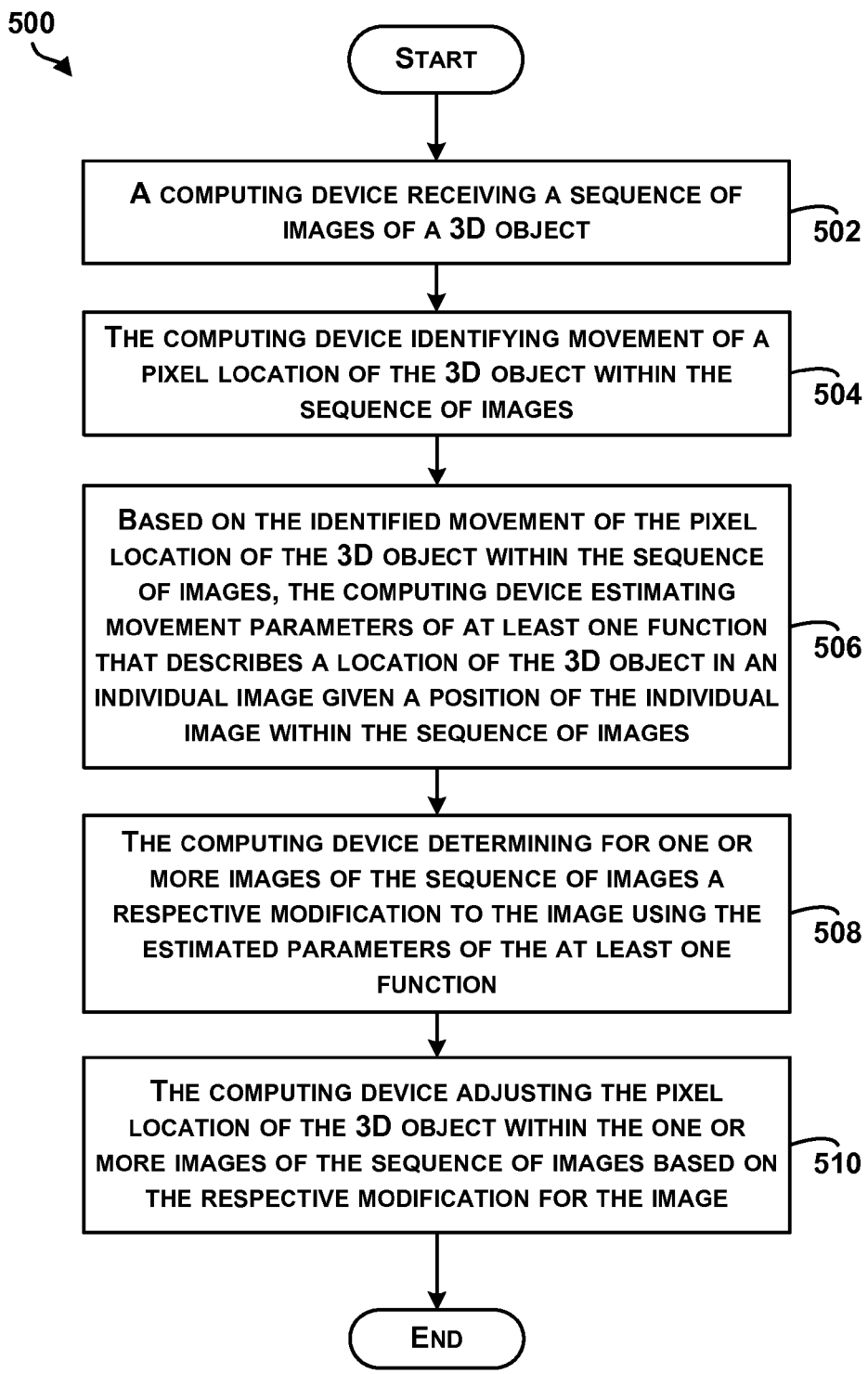
FIG. 5 is a block diagram of an example method for auto-centering swivel views.

Referring now to FIG. 5, FIG. 5 is a block diagram of an example method 500 for auto-centering swivel views. Method 500 shown in FIG. 5 presents an embodiment of a method that could be performed by the computing device 100 of FIG. 1, for example, or by any computing device. Method 500 may include one or more operations, functions, or actions as illustrated by one or more of blocks 502-510. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and random access memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 500 and other processes and methods disclosed herein, each block in FIG. 5 may represent circuitry that is wired to perform the specific logical functions in the process.

Initially, at block 502, the method 500 includes a computing device receiving a sequence of images of a 3D object. In one example, each image of the received sequence of images may correspond to a view of the 3D object from a different angular orientation about the 3D object. Thus, each image may be a swivel view. Furthermore, each of the images may be equally spaced around a curved path in a plane that is perpendicular to an axis that passes through the 3D object. As an example, each image may be captured by a fixed camera as an object is incrementally rotated by a turntable. In one instance, the turntable may be rotated by a specific increment between each captured image (e.g., one degree, five degrees, ten degrees, etc.). Therefore, the number of images in the sequence may vary depending on the specific increment.

At block 504, the method 500 includes the computing device identifying movement of a pixel location of the 3D object within the sequence of images. As used herein, the term pixel location may refer to the location of one or more pixels in an image that represent the 3D object. For instance, a pixel location of a 3D object may refer to a single pixel location in a particular image (e.g., an x,y pixel position that is the center of multiple pixels representing the 3D object in the image), or a pixel location may refer to a collection of pixel locations in a particular image (e.g., a collection of x,y pixel positions representing the 3D object in the image).

Furthermore, as used herein, movement of the pixel location of the 3D object within the sequence of images may therefore refer to one or any combination of change(s) in horizontal position, change(s) in vertical position, change(s) in size (e.g., horizontal width and/or vertical height), and change(s) in orientation/pose of the 3D object within the sequence of images.

In order to estimate movement parameters describing the off-center effects, movement of the pixel location of the 3D object within each image of the sequence of images may be determined. Various computer vision techniques may be used to track or determine movement of the pixel location of the 3D object throughout the sequence of images.

As one example, movement of the 3D object's center of pixel mass may be determined with respect to one or more axes of the image. To determine the 3D object's center of pixel mass, pixels that correspond to the 3D object (as opposed to background pixels) may be determined. If the color of the background is known, the pixels representing the 3D object may be isolated from the background pixels in each image. Other computer vision methods for separating background pixels from pixels belonging to a 3D object may also be used.

After the pixels of a particular image that belong to the 3D object have been identified, the locations of the pixels may be averaged to determine a center of pixel mass with respect to one or more axes of the image. For instance, each pixel corresponding to the 3D object may be identified by an x and y location in the image. The center of pixel mass for a particular image may then be determined by averaging each of the x locations and averaging each of the y locations. And movement of the pixel location of the 3D object between images may then be approximated by comparing the 3D object's center of pixel mass in the images.

As another example, movement of individual feature points of the 3D object may be determined and tracked between images using optical flow. For example, corners of the 3D object, edges between different parts of the 3D object, or other types of feature points may be identified for a first image and an adjacent image. A change in the location of two corresponding feature points between the first image and the adjacent image may then be determined. And the change in the location of the feature points may be used as an approximation for movement of the pixel location of the 3D object.

As still another example, movement of the location of an overall silhouette of the 3D object may be determined. This approach may be advantageous for radially symmetric objects, for instance. By way of example, a silhouette of the 3D object may be determined for a first image and an adjacent image. A location of a particular edge of the silhouette (e.g., a leftmost edge, a rightmost edge, a top edge, or a bottom edge) in the first image and the second image may then be compared. A change in the location of the edge of the silhouette may then be used as an approximation for movement of the pixel location of the 3D object.

At block 506, the method 500 includes, based on the identified movement of the pixel location of the 3D object within the sequence of images, the computing device estimating movement parameters of at least one function that describes a location of the 3D object in an individual image given a position of the individual image within the sequence of images. For instance, the identified movement of the pixel location of the 3D object may be fitted to functions that describe idealized pixel offsets for an individual image as a function of a position of the individual image within the sequence of images.

In one example, movement of the 3D object's center of pixel mass with respect to an x-axis of the image may be used to estimate parameters of a first function. For instance, the particular function may take the form of Equation 1:

$$x\text{Ideal}[i] = X\text{Amplitude} * \cos(\text{angle}[i] + \text{phase}) + x_0 \quad (1)$$

where i is a position of the image in the sequence of images, $$\text{angle}[i] = \frac{360i}{N},$$

N is the number of images in the sequence of images, and $x_0$ is the 3D object's center of pixel mass with respect to the x-axis in the first image of the sequence of images.

If the 3D object's observed center of pixel mass with respect to the x-axis is center_x[i], XAmplitude and phase may then be calculated by minimizing Equation 2:

$$\Sigma_i |x\text{Ideal}[i] - \text{center\_}x[i]|. \quad (2)$$

After solving for XAmplitude and phase, additional movement parameters may also be calculated. For example, a vertical pixel offset may be calculated by tracking movement of feature points between adjacent images. In one instance, the vertical movement of the location of the 3D object may be described by Equation 3:

$$y\text{Ideal}[i] = Y\text{Amplitude} * \sin(\text{angle}[i] + \text{phase}). \quad (3)$$

Furthermore, a change in the size of the 3D object may be described by Equation 4

$$\text{scaleIdeal}[i] = \text{ScaleAmplitude} * \sin(\text{angle}[i] + \text{phase}). \quad (4)$$

For j feature points, if feature point j in an image i is located at featureX[j], featureY[j] and the corresponding feature point j in an adjacent image i+1 is located at featureNewX[j], featureNewY[j], ScaleAmplitude and YAmplitude can be solved for by minimizing Equation 5:

$$\sum_i \sum_j \left| \left( \frac{\text{featureY}[j]}{\text{scale}[i]} - y\text{Ideal}[i] \right) - \left( \frac{\text{featureNewY}[j]}{\text{scale}[i+1]} - y\text{Ideal}[i+1] \right) \right|. \quad (5)$$

In practice, other types of functions or other combinations of functions may be used to solve for a horizontal offset, vertical offset, and/or scaling factor to apply to an image to correct any off-center effects.

At block 508, the method 500 includes the computing device determining for one or more images of the sequence of images a respective modification to the image using the estimated parameters of the at least one function. For example, continuing with the example described with respect to Equations 1-5, the inverse of xIdeal[i] then reveals the horizontal pixel offset that may be applied to image i to correct a horizontal "orbiting" effect. Additionally, the inverse of yIdeal[i] and scaleIdeal[i] then reveal the appropriate vertical scaling factor and vertical offset that may be applied to an image i to re-center the image and correct any vertical "bouncing" and size change effects.

And at block 510, the method 500 includes the computing device adjusting the location of the 3D object within the one or more images of the sequence of images based on the respective modification for the image. By way of example, the computing device may shift the pixels of each of the one or more images, scale each of the one or more images, or both. The pixel shift may be a horizontal shift, a vertical shift, or both. Similarly, the image may be scaled in the horizontal direction, the vertical direction, or both. In some instances, scaling the image may involve enlarging the image in one or more directions. In other instances, scaling the image may involve shrinking the image in one or more directions.

In some examples, the method 500 may also involve cropping the images of the sequence of images after adjusting the location of the 3D object in one or more of the images. For example, each of the images may be cropped to remove any blank boundaries introduced due to a horizontal and/or vertical shift, for instance. In one instance, each of the images may be cropped on each side by an amount that is equal to the largest pixel shift in a corresponding direction. For example, if the largest upward shift that was applied to any of the images was 6 pixels, 6 pixels may be removed from the bottom of each of the images. Similarly, if the largest rightward shift that was applied to any of the images was 15 pixels, 15 pixels may be removed from the left of each of the images.

In the example described above, there are four degrees of freedom and four parameters need to be estimated (i.e., XAmplitude, YAmplitude, ScaleAmplitude, and phase). In some examples, the method 500 may also make use of information about a camera calibration and geometric layout of a scene in order to reduce the number of degrees of freedom. For example, if information about the camera calibration and geometric layout of a scene are known, the number of degrees of freedom involved in estimating the parameters is reduced from four to two.

By way of example, in one instance, the computing device configured to carry out the method 500 may also be configured to receive camera calibration information and turntable geometry information. The camera calibration information and turntable geometry information may describe the conditions that were present when the sequence of images was captured by a camera, for example. If the camera calibration and turntable geometry are known, the computing device may estimate one amplitude and phase, and then derive the remaining parameters based on the camera calibration, turntable geometry, and estimated amplitude and phase. For instance, the computing device may estimate XAmplitude and phase, and then derive YAmplitude and ScaleAmplitude based on the estimated parameters and the information about the camera calibration and turntable geometry.

Further conceptual examples of some of the functions of the method 500 are described below with reference to FIGS. 6-12. For example, FIGS. 6, 7, and 8 are conceptual illustrations of identifying movement of a pixel location of a 3D object between two images.

Figure 6:
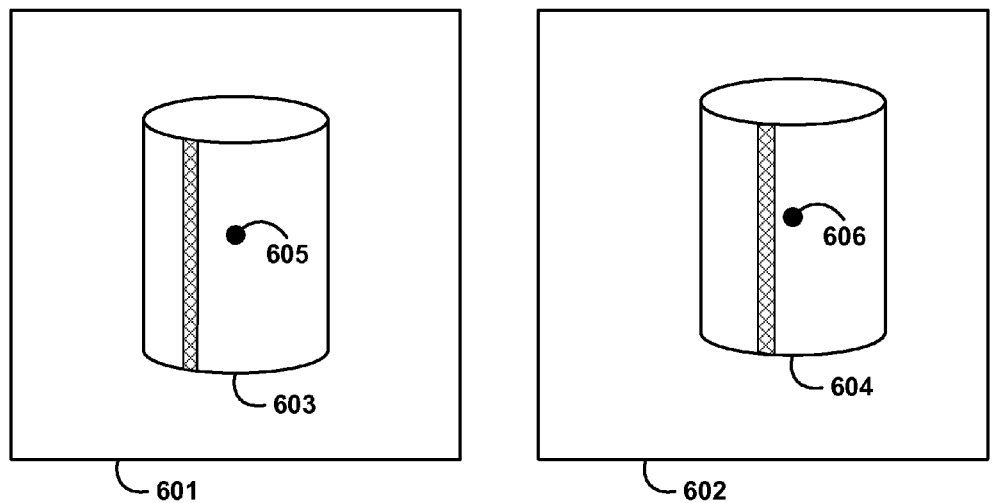
FIGS. 6, 7, and 8 are conceptual illustrations of an example of identifying movement of a pixel location of a 3D object between two images.

FIG. 6 conceptually illustrates movement of a pixel location of a 3D object between a first image 601 and a second image 602. Each of the images 601 and 602 may be an image of a 3D object from a different angular orientation. For instance, images 601 and 602 may have been captured by a turntable system. Specifically, image 601 may have been captured at a first instance in time, and image 602 may have been captured at a second instance in time after the turntable has been rotated by five degrees.

As shown in FIG. 6, the pixel location of the 3D object may be represented by a pixel mass 603 in the image 601. The center of the pixel mass may be a position 605. In the image 602, a location of a pixel mass 604 of the 3D object has shifted to the left and upwards within the image domain. As a result, the center of the pixel mass 604 is at a position 606. When compared to the position 605, the position 606 is offset towards the top-left corner of the image 602. For example, the position 605 may be at an x-y pixel position of (0, 0) and the position 606 may be at a pixel position of (4, 2). Assuming the image 601 is the first image in a sequence of images, the horizontal offset for the location of the 3D object in the image 602 may therefore be four pixels and the vertical offset may be two pixels.

Figure 7:
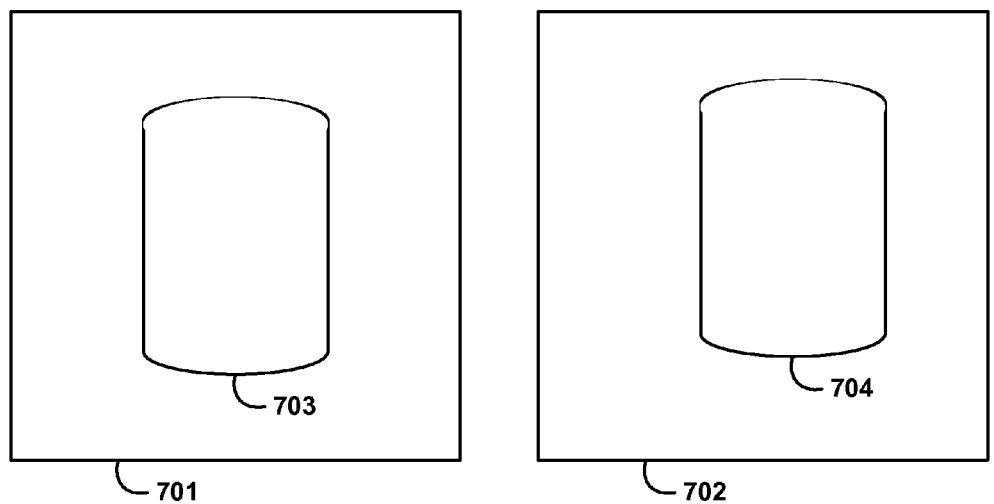
Figure 8:
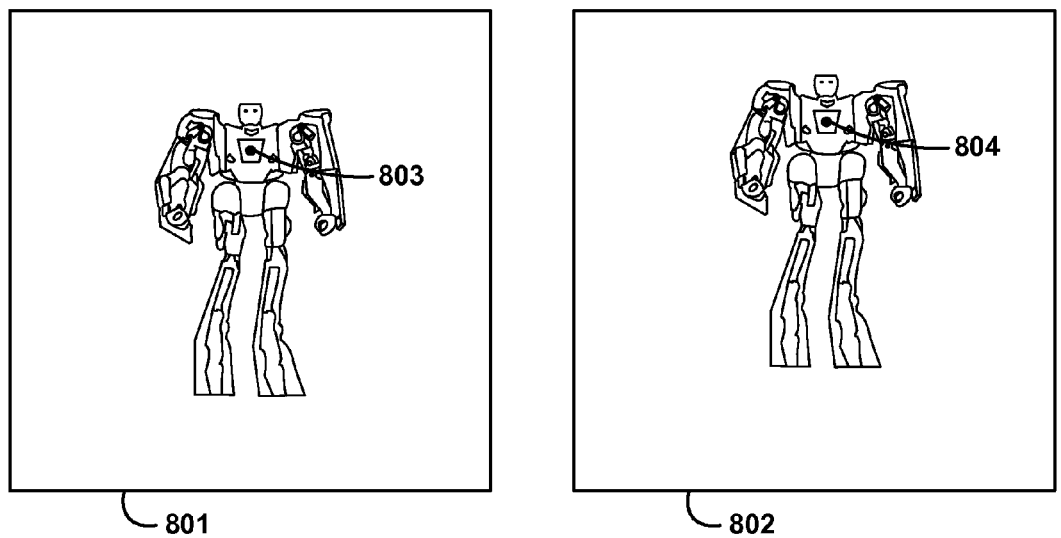

FIG. 7 also conceptually illustrates movement of a pixel location of a 3D object between a first image 701 and a second image 702. As shown in FIG. 7, in the image 701, the pixel location of the 3D object may be represented by a silhouette 703. Similarly, the pixel location of the 3D object may also be represented by a silhouette 704 in the image 702. In one example, movement of the pixel location of the 3D object between the image 701 and the image 702 may be identified based on the location of the silhouette 703 in the first image 701 and the location of the silhouette 704 in the second image 702.

For instance, if the right edge of the silhouette 703 is located at an x pixel position of (−5) and the right edge of the silhouette 704 is located at an x pixel position of −3, a computing device may determine that the location of the 3D object has shifted two pixels to the right between the image 701 and the image 702. Likewise, movement of the pixel location of the 3D object in the vertical direction between the image 701 and the image 702 may be estimated based on a difference between a position of the top edge of the silhouette 703 and a top edge of the silhouette 704. For instance, if the top edge of silhouette 703 is located at a y pixel position of (45) and the top edge of silhouette 704 is located at a y pixel position of (50), a computing device may determine that the pixel location of the 3D object has shifted upwards by five pixels between the image 701 and the image 702.

FIG. 8 also conceptually illustrates movement of a pixel location of a 3D object between a first image 801 and a second image 802. In particular, FIG. 8 illustrates the locations of an identified feature point in images 801 and 802. As shown in FIG. 8, the 3D object may be an action figure, and the identified feature point may be a region on the chest of the action figure. For example, in image 801, an identified feature point 803, located at an x-y pixel position of (0, 15), is shown. Similarly, in image 802, an identified feature point 804 corresponding to feature point 803 is shown. Feature point 804 may be located at an x-y pixel position of (0, 19), for instance. Given the locations of the identified feature points 803 and 804, a computing device may determine that the pixel location of the 3D object has moved four pixels upward between the image 801 and the image 802.

In an example in which multiple feature points of the 3D object are identified in each of the image 801 and 802 (not shown), a computing device may estimate an amount of movement of the pixel location of the 3D object between the image 801 and the image 802 based on an average movement of corresponding feature points. For instance, if the locations of a first pair of feature points indicate that the pixel location of the 3D object has moved six pixels upward and the locations of a second pair of feature points indicate that the pixel location of the 3D object has moved four pixels upward, the computing device may determine that the pixel location of the 3D object has moved five pixels upward between the image 801 and the image 802.

Figure 9:
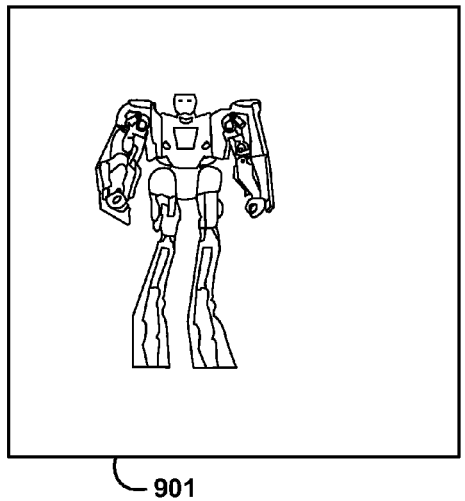
FIGS. 9, 10, and 11 are conceptual illustrations of an example of adjusting a pixel location of a 3D object.
Figure 9:
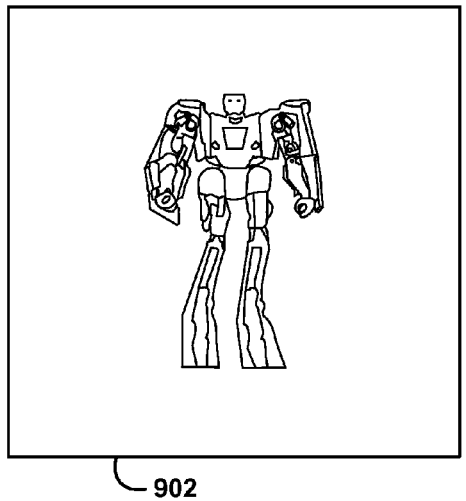
Figure 10:
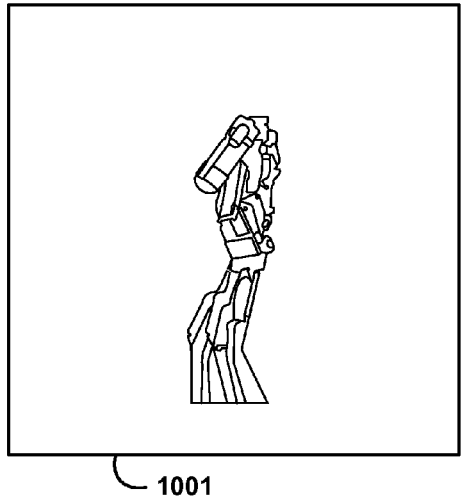
Figure 10:
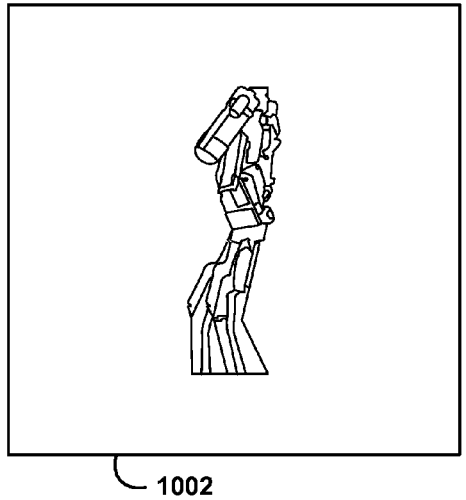
Figure 11:
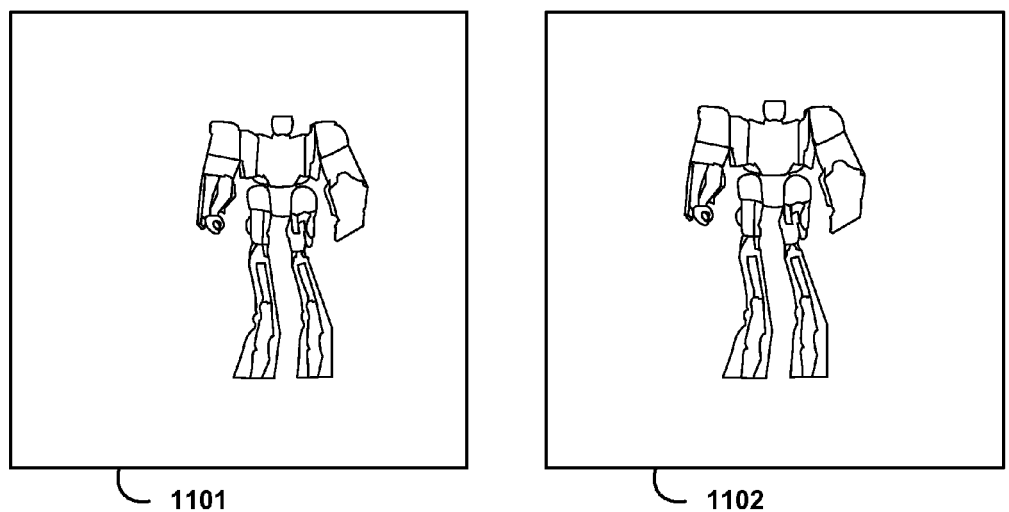

FIGS. 9, 10, and 11 are conceptual illustrations of adjusting a pixel location of a 3D object. By way of example, FIGS. 9, 10, and 11 illustrate adjustments to a pixel location of a 3D object for three different swivel views of the 3D object.

FIG. 9 illustrates an image 901 that represents a first swivel view (e.g., a front view) before a correction is applied. FIG. 9 also illustrates an image 902 that represents the same swivel view after a correction has been applied. As shown in FIG. 9, after determining that a pixel location of the 3D object in image 901 should be shifted to the right, the pixel location of the 3D object may be adjusted by shifting the pixels of the image 901 to the right, resulting in the image 902. Consequently, the 3D object is located in approximately the center of the image 902.

FIG. 10 illustrates an image 1001 that represents a second swivel view (e.g., a side view) before a correction is applied. FIG. 10 also illustrates an image 1002 that represents the same swivel view after a correction has been applied. As shown in FIG. 10, after determining that a pixel location of the 3D object in image 1001 should be shifted upwards, the pixel location of the 3D object may be adjusted by shifting the pixels of the image 1001 upwards, resulting in the image 1002. Consequently, the 3D object is located in approximately the center of the image 1002.

FIG. 11 illustrates an image 1101 that represents a third swivel view (e.g., a back view) before a correction is applied. FIG. 11 also illustrates an image 1102 that represents the same swivel view after a correction has been applied. As shown in FIG. 11, after determining that a pixel location of the 3D object in image 1101 should be shifted left and increased in size in the vertical direction, the pixel location of the 3D object may be adjusted by shifting the pixels of the image 1101 to the left and scaling the pixels of the image 1101 in the vertical direction, resulting in the image 1102. Consequently, the 3D object is located in approximately the center of the image 1102.

As discussed above, in some instances, adjusting a pixel location of a 3D object in an image may introduce blank boundaries into the image. To address this issue, images may be cropped to remove any blank boundaries, and prevent the blank boundaries from appearing when the images are presented in a swivel viewer.

Figure 12:
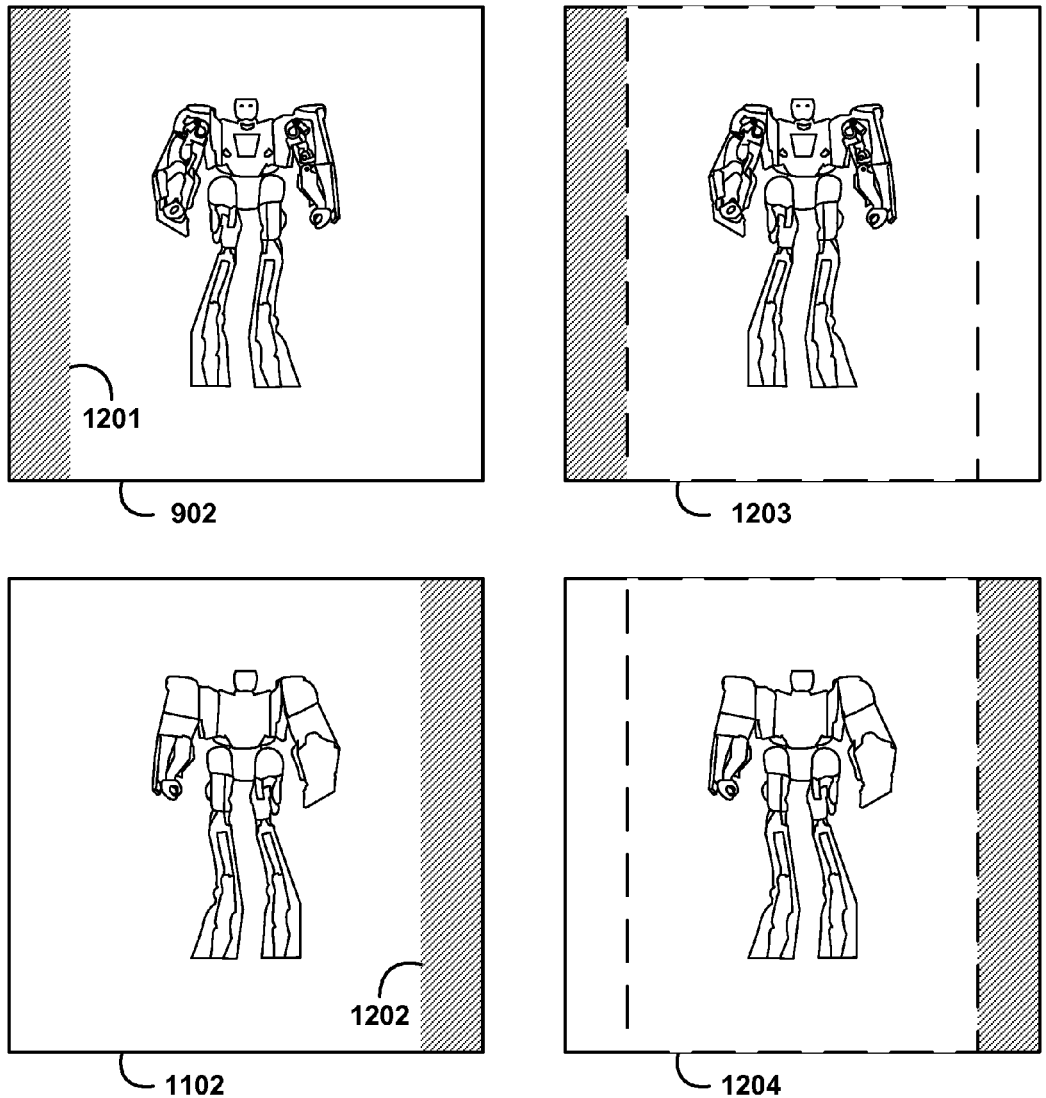
FIG. 12 is a conceptual illustration of an example of cropping images.

FIG. 12 is a conceptual illustration of cropping images. In particular, FIG. 12 illustrates a detailed view of the images 902 and 1102 from FIGS. 9 and 11 respectively. Recall that image 902 was the result of a horizontal pixel shift to the right and image 1102 was the result of a horizontal pixel shift to the left. As a result of the horizontal pixel shifts, blank regions, for which no pixel data is available, may be created. For instance, a blank region 1201 is shown for the image 902 and a blank region 1202 is shown for the image 1102.

The blank regions 902 and 1202 may be removed by cropping the images 902 and 1102. In FIG. 12, dotted lines are shown to indicate the boundaries of cropped images 1203 and 1204, which correspond to the images 902 and 1102, respectively. In one example, a computing device may determine a crop region based on the size of any pixel shifts applied to the images. For instance, the crop region may be determined based on the maximum leftward pixel shift and the maximum rightward pixel shift applied to images of a sequence of images.

Assuming that the image 902 resulted from the maximum rightward pixel shift for a sequence of images and the image 1102 resulted from the maximum leftward pixel shift for the sequence of images, the cropping region may correspond to the edges of the blank regions 902 and 1202. For example, if the maximum leftward pixel shift was ten pixels and the maximum rightward pixel shift was also ten pixels, ten pixels may be cropped from the left and right sides of the images 902 and 1202, resulting in the cropped images 1203 and 1204.

Figure 13:
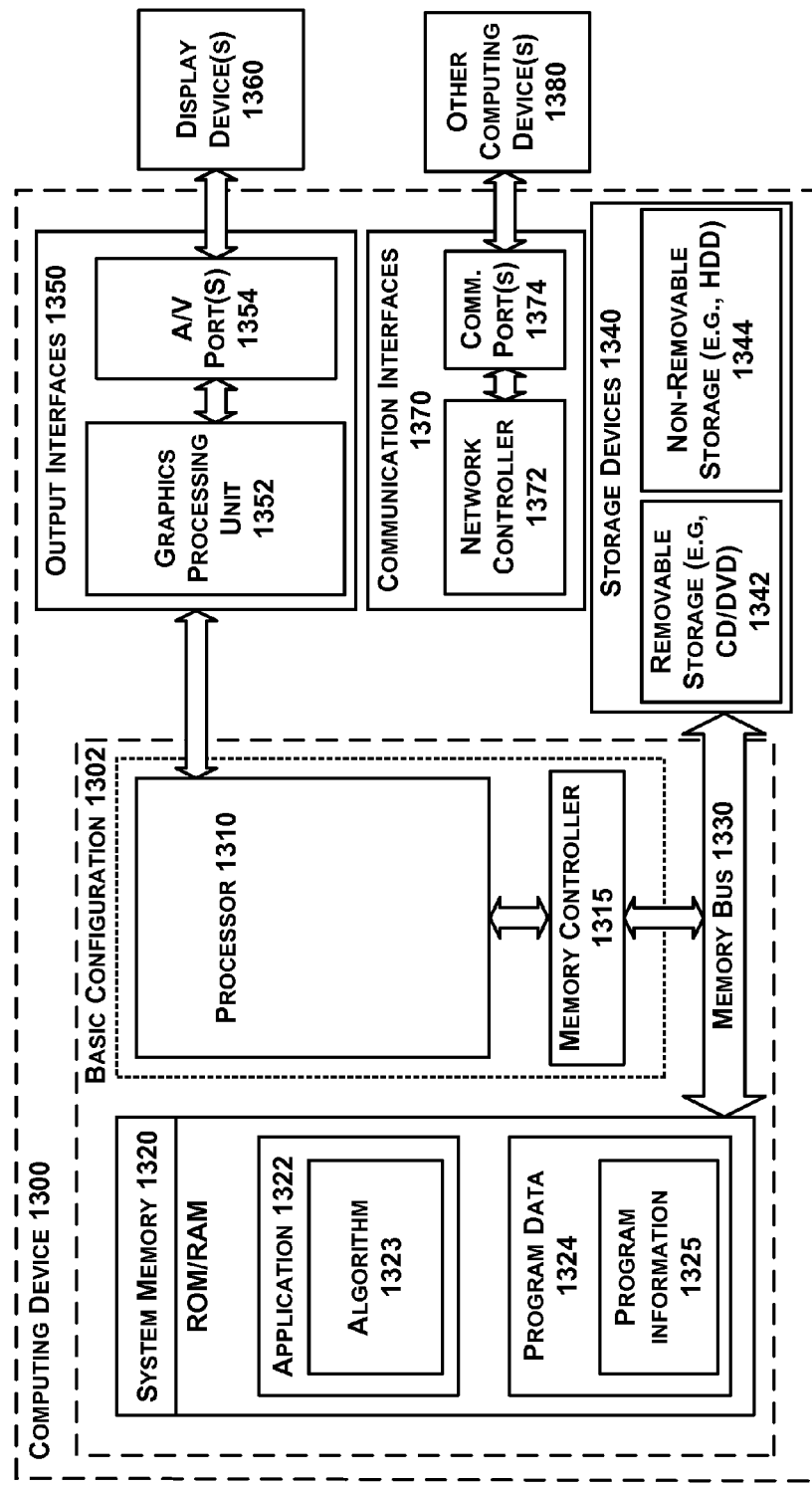
FIG. 13 is a functional block diagram illustrating an example computing device used in a computing system that is arranged in accordance with at least some embodiments described herein.

FIG. 13 is a functional block diagram illustrating an example computing device 1300 used in a computing system that is arranged in accordance with at least some embodiments described herein. The computing device 1300 may be a personal computer, server, mobile device, cellular phone, tablet computer, video game system, or other type of computing device, and may be implemented to auto-center swivel views as described in FIGS. 1-12. In a basic configuration 1302, computing device 1300 may typically include one or more processors 1310 and system memory 1320. A memory bus 1330 can be used for communicating between the processor 1310 and the system memory 1320. Depending on the desired configuration, processor 1310 can be of any type including but not limited to a microprocessor (μP), a microcontroller (μC), a digital signal processor (DSP), or any combination thereof. A memory controller 1315 can also be used with the processor 1310, or in some implementations, the memory controller 1315 can be an internal part of the processor 1310.

Depending on the desired configuration, the system memory 1320 can be of any type including but not limited to volatile memory (such as RAM), non-volatile memory (such as ROM, flash memory, etc.) or any combination thereof. System memory 1320 may include one or more applications 1322, and program data 1324. Application 1322 may include an auto-centering algorithm 1323 that is arranged to auto-center swivel views, in accordance with the present disclosure. Program data 1324 may include program information 1325 that could be directed to any number of types of data. In some example embodiments, application 1322 can be arranged to operate with program data 1324 on an operating system.

Computing device 1300 can have additional features or functionality, and additional interfaces to facilitate communications between the basic configuration 1302 and any devices and interfaces. For example, data storage devices 1340 can be provided including removable storage devices 1342, non-removable storage devices 1344, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 1320 and storage devices 1340 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1300. Any such computer storage media can be part of device 1300.

Computing device 1300 can also include output interfaces 1350 that may include a graphics processing unit 1352, which can be configured to communicate to various external devices such as display devices 1360 or speakers via one or more A/V ports 1354 or a communication interface 1370.

The communication interface 1370 may include a network controller 1372, which can be arranged to facilitate communications with one or more other computing devices 1380 over a network communication via one or more communication ports 1374. The communication connection is one example of a communication media.

Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 1300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1300 can also be implemented as a personal computer including both laptop computer and non-laptop computer configurations.

In some embodiments, the disclosed methods may be implemented as computer program instructions encoded on a non-transitory computer-readable storage media in a machine-readable format, or on other non-transitory media or articles of manufacture. FIG. 14 is a schematic illustrating a conceptual partial view of an example computer program product that includes a computer program for executing a computer process on a computing device, arranged according to at least some embodiments presented herein.

In one embodiment, the example computer program product 1400 is provided using a signal bearing medium 1401. The signal bearing medium 1401 may include one or more programming instructions 1402 that, when executed by one or more processors may provide functionality or portions of the functionality described above with respect to FIGS. 1-13. In some examples, the signal bearing medium 1401 may encompass a computer-readable medium 1403, such as, but not limited to, a hard disk drive, a Compact Disc (CD), a Digital Video Disk (DVD), a digital tape, memory, etc. In some implementations, the signal bearing medium 1401 may encompass a computer recordable medium 1404, such as, but not limited to, memory, read/write (R/W) CDs, R/W DVDs, etc. In some implementations, the signal bearing medium 1401 may encompass a communications medium 1405, such as, but not limited to, a digital and/or an analog communication medium (e.g., a fiber optic cable, a waveguide, a wired communications link, a wireless communication link, etc.). Thus, for example, the signal bearing medium 1401 may be conveyed by a wireless form of the communications medium 1405 (e.g., a wireless communications medium conforming with the IEEE 802.11 standard or other transmission protocol).

The one or more programming instructions 1402 may be, for example, computer executable and/or logic implemented instructions. In some examples, a computing device such as the computing device 1300 of FIG. 13 may be configured to provide various operations, functions, or actions in response to the programming instructions 1402 conveyed to the computing device 1300 by one or more of the computer readable medium 1403, the computer recordable medium 1404, and/or the communications medium 1405.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    a computing device receiving a sequence of images of a three-dimensional (3D) object for display on a swivel viewer, wherein the swivel viewer comprises an interface to browse images of the sequence of images corresponding to views of the 3D object from different angular orientations about the 3D object;
    the computing device identifying movement of a pixel location of the 3D object within the sequence of images;
    based on the identified movement of the pixel location of the 3D object within the sequence of images, the computing device estimating movement parameters of at least one function that describes a location of the 3D object in an individual image given a position of the individual image within the sequence of images;
    the computing device determining for one or more images of the sequence of images a respective modification to the image for display in the swivel viewer, using the estimated parameters of the at least one function, such that display of the sequence of images is compensated for a pixel offset when rotated in the swivel viewer;
    the computing device adjusting the pixel location of the 3D object within the one or more images of the sequence of images based on the respective modification for the image to generate one or more adjusted images of the sequence of images; and
    the computing device providing the one or more adjusted images of the sequence of images for display to the swivel viewer.

2. The method of claim 1, wherein the swivel viewer comprises a click and drag interface to browse the sequence of images.

3. The method of claim 1, wherein the swivel viewer comprises a sliding interface to browse the sequence of images.

4. The method of claim 1, wherein identifying the movement of the pixel location of the 3D object within the sequence of images comprises identifying for images of the sequence of images a center of the 3D object with respect to at least one axis of the image.

5. The method of claim 4, wherein the at least one axis of the image comprises a horizontal axis or a vertical axis.

6. The method of claim 4, wherein identifying for images of the sequence of images a center of the 3D object comprises:
    identifying for images of the sequence of images pixels that represent the 3D object; and
    determining for images of the sequence of images a center of pixel mass of the 3D object within the image based on the pixels that represent the 3D object.

7. The method of claim 1, wherein identifying the movement of the pixel location of the 3D object within the sequence of images comprises identifying for images of the sequence of images a change in the pixel location of the 3D object within the images with respect to a pixel location of the 3D object within another image.

8. The method of claim 7, wherein the other image comprises a first image of the sequence of images.

9. The method of claim 7, wherein the other image comprises an adjacent image to the image in the sequence, the method further comprising:
    identifying for images of the sequence of images a location of one or more feature points of the 3D object within the images and a location of the one or more feature points of the 3D object within the adjacent image to the images; and
    determining for images of the sequence of images the change in the pixel location of the 3D object within the images based on a movement of the one or more feature points between the images and the adjacent image to the image.

10. The method of claim 1, wherein the sequence of images of the 3D object comprises images of the 3D object captured as the 3D object rotates on a turntable.

11. The method of claim 1, wherein the sequence of images of the 3D object comprise images of the 3D object captured from a sequence of positions along a curved path in at least one plane perpendicular to an axis that passes through the 3D object.

12. The method of claim 1, wherein the at least one function comprises a trigonometric function that defines a location of the 3D object in an individual image with respect to an axis of the image given a position of the individual image within the sequence of images.

13. The method of claim 12, wherein the movement parameters of the at least one function comprise an amplitude and a phase of the trigonometric function.

14. The method of claim 1, wherein the at least one function comprises a horizontal movement trigonometric function and a vertical movement trigonometric function.

15. The method of claim 14, wherein the at least one function further comprises a scale function that describes a change in a size of the 3D object in an individual image given a position of the individual image within the sequence of images.

16. The method of claim 1, wherein the respective modification for each of the one or more images comprises one or any combination of a horizontal shift of the image, a vertical shift of the image, and a scaling of the image.

17. The method of claim 1, wherein adjusting the pixel location of the 3D object within the one or more images of the sequence of images based on the respective modification for the image comprises shifting pixels of the image, scaling the image, or both.

18. The method of claim 1, further comprising cropping each image of the sequence of images after adjusting the pixel location of the 3D object within the one or more images of the sequence of images based on the respective modification for the image.

19. A non-transitory computer-readable medium having stored therein instructions, that when executed by a computing device, cause the computing device to perform functions comprising:
receiving a sequence of images of a three-dimensional (3D) object for display on a swivel viewer, wherein the swivel viewer comprises an interface to browse images of the sequence of images corresponding to views of the 3D object from different angular orientations about the 3D object;
identifying movement of a pixel location of the three-dimensional (3D) object within the sequence of images;
based on the identified movement of the pixel location of the 3D object within the sequence of images, estimating movement parameters of at least one function that describes a location of the 3D object in an individual image given a position of the individual image within the sequence of images;
determining for one or more images of the sequence of images a respective modification to the image for display on the swivel viewer, using the estimated parameters of the at least one function, such that display of the sequence of images is compensated for a pixel offset when rotated in the swivel viewer;
adjusting the pixel location of the 3D object within the one or more images of the sequence of images based on the respective modification for the image to generate one or more adjusted images of the sequence of images; and
providing the one or more adjusted images of the sequence of images for display to the swivel viewer.

20. The non-transitory computer-readable medium of claim 19, wherein identifying the movement of the pixel location of the 3D object within the sequence of images comprises identifying for images of the sequence of images a center of the 3D object with respect to at least one axis of the images.

21. The non-transitory computer-readable medium of claim 19, wherein identifying the movement of the pixel location of the 3D object within the sequence of images comprises identifying for images of the sequence of images a change in the pixel location of the 3D object within the images with respect to a pixel location of the 3D object within another image.

22. The non-transitory computer-readable medium of claim 19, wherein adjusting the pixel location of the 3D object within the one or more images of the sequence of images based on the respective modification for the image comprises shifting pixels of the image, scaling the image, or both.

23. A computing device, comprising:
a processor; and
a non-transitory computer-readable medium, configured to store instructions, that when executed by the processor, cause the computing device to perform functions comprising:
receiving a sequence of images of a three-dimensional (3D) object for display on a swivel viewer, wherein the swivel viewer comprises an interface to browse images of the sequence of images corresponding to views of the 3D object from different angular orientations about the 3D object;
identifying movement of a pixel location of the three-dimensional (3D) object within the sequence of images,
based on the identified movement of the pixel location of the 3D object within the sequence of images, estimating movement parameters of at least one function that describes a location of the 3D object in an individual image given a position of the individual image within the sequence of images,
determining for one or more images of the sequence of images a respective modification to the image for display on the swivel viewer, using the estimated parameters of the at least one function, such that display of the sequence of images is compensated for a pixel offset when rotated in the swivel viewer,
adjusting the pixel location of the 3D object within the one or more images of the sequence of images based on the respective modification for the image to generate one or more adjusted images of the sequence of images, and
providing the one or more adjusted images of the sequence of images for display to the swivel viewer.

24. The computing device of claim 23, wherein identifying the movement of the pixel location of the 3D object within the sequence of images comprises identifying for images of the sequence of images a center of the 3D object with respect to at least one axis of the images.

25. The computing device of claim 23, wherein identifying the movement of the location of the 3D object within the sequence of images comprises identifying for images of the sequence of images a change in the pixel location of the 3D object within the images with respect to a pixel location of the 3D object within another image.

26. The computing device of claim 23:
wherein the instructions further comprise instructions that cause the computing device to receive camera calibration information and turntable geometry information associated with the sequence of images,
wherein the movement parameters of the at least one function are estimated based on the identified movement of the pixel location of the 3D object within the sequence of images and the received camera calibration information and turntable geometry information.

* * * * *